United States Patent [19]

Hisey

[11] Patent Number: 5,208,503
[45] Date of Patent: May 4, 1993

[54] ENERGY-EFFICIENT FERROMAGNETIC STATOR AND CORE APPARATUS

[76] Inventor: Bradner L. Hisey, 19325 Athos Pl., Saratoga, Calif. 95070

[21] Appl. No.: 684,569

[22] Filed: Apr. 12, 1991

[51] Int. Cl.⁵ .............................................. H02K 1/12
[52] U.S. Cl. ..................................... 310/259; 310/42; 310/44; 310/216
[58] Field of Search ............... 310/42, 43, 44, 125, 310/216, 217, 254, 257, 258, 260, 261, 259

[56] References Cited

U.S. PATENT DOCUMENTS

| | | | |
|---|---|---|---|
| 2,363,337 | 11/1944 | Kelly | 310/44 |
| 3,254,372 | 6/1966 | Hofbaver | 310/217 |
| 3,768,152 | 10/1973 | Swanke et al. | 310/43 |
| 3,983,433 | 9/1976 | Sims | 310/254 |
| 3,983,434 | 9/1976 | Sims | 310/254 |
| 3,983,435 | 9/1976 | Sims | 310/259 |
| 4,395,815 | 8/1983 | Stanley et al. | 310/216 X |
| 5,105,115 | 4/1992 | Shinryo et al. | 310/258 |

FOREIGN PATENT DOCUMENTS 100048 7/1980 Japan ..................... 310/261

Primary Examiner—Steven L. Stephan
Assistant Examiner—Ed To
Attorney, Agent, or Firm—Flehr, Hohbach, Test, Albritton & Herbert

[57] ABSTRACT

Energy efficiency of electric motors and transformer, inductor and ballast apparatus is increased through use of amorphous ferromagnetic materials and thin section electrical steels by methods using folding of lamination stock, forming of lamination stock after folding or punching, and stacking to form substantially solid flux-conducting structures. Such apparatus may employ multiple ferromagnetic materials to conduct major portions of the magnetic flux in the apparatus magnetic circuit. Apparatus is also described in which magnetic and mechanical support functions reside in differing ferromagnetic or structural plastic materials in composite structures.

23 Claims, 5 Drawing Sheets

ENERGY-EFFICIENT FERROMAGNETIC STATOR AND CORE APPARATUS

BACKGROUND OF THE INVENTION

Approximately 2% of the energy generated in the United States is dissipated in the iron losses of ferromagnetic structures in electric motors in the power range of 1 to 125 horsepower and in ballasts for gas-discharge lamps including fluorescents. 60-80 percent of this loss may be spared with more efficient ferromagnetic structures.

Iron losses in ferromagnetic materials are squared functions of maximum induction, exciting frequency, and material, e.g., lamination, thickness. All may be manipulated to reduce iron loss. Stator lamination iron losses dominate energy dissipation in common alternating current rotating machines as they are driven at line frequency whereas the armature usually experiences only a DC or slip-frequency (1 to 5 hz.) magnetic flux. Iron losses may also be a major loss source in brushless direct current motors as the stators may be driven at high frequencies by phase switching or the even higher frequency components of pulse-width modulation drives. Iron losses in transformer-like apparatus including transformers, ballasts, and inductors are concentrated in laminated cores.

In these products it is desirable to limit iron losses or improve high frequency performance through the use of intrinsically low-loss materials, thin lamination sections, or both. This has been done successfully in contemporary distribution transformers which use wound cores of substantially amorphous ferromagnetic materials, often called metallic glasses, referred to hereinafter generically as amorphous ferromagnetic materials. Modest improvements in other areas have been achieved through reduced flux density, thinner lamination sections, and improved metal alloys and metal processing, but the major potential gains of amorphous ferromagnetic material technology have not been widely realized.

Amorphous ferromagnetic material such as Allied-Signal Metglas TM lacks crystalline structure and therefore is isotropic, having the same permeability in all directions, and has about one-tenth the losses of common crystalline iron alloys It is formed by planar flow casting or spraying in a sheet roughly 1 mil thick, obviating costs of subsequent thickness reduction through rolling as is required when producing thin laminations from common 12 and 14 mil sheet steel lamination stock. However its hardness is in the range of 63-70 Rockwell C, like many tool steels, so that it is machined only by grinding, EDM, or lasers, and those at the risk of heat-induced crystal formation and performance degradation. According to the manufacturer it may be folded with a zero internal radius prior to annealing, an extraordinary attribute for a very hard material, because of its lack of crystalline structure. It may be slit and sheared economically, perhaps because maintenance costs on the simple tooling used are bearable. Punching, as for stator laminations, is impractical due to the material hardness and thin sections.

Reduced losses can also be achieved with thin section (under 12 mils) electrical steels, most commonly silicon alloyed, which are much more readily fabricated than are amorphous ferromagnetic materials but add to their base cost the costs of thickness reduction and the handling of the increased parts count if parts are not produced by quasi-continuous processes.

Major components of a permanent-magnet rotor axial-gap motor, shown in FIG. 1, illustrate problems of fabricating motor stator components of laminated materials using prior art. A rotor assembly 51, comprising a hub 52, four axially polarized magnets 53 disposed equally about the perimeter of the hub 52 with polarization directions alternating (this rotor assembly example is called a quadrupole). The hub 52 is fixed to a longitudinal shaft 54 rotatably mounted in bearings (not shown) and a motor frame (not shown) which place the rotor assembly 51 between two stator assemblies 55 and 56 separated from the rotor assembly 51 by small axial airgaps on both sides of the rotor assembly 51. The faces of the stators are shaped to include slots 57, and teeth 58 between said slots 57, which support windings (none are shown in this document) which systematically magnetize the stator assemblies 55 and 56 to produce torque on the rotor assembly 51. The dominant magnetic flux paths pass normally through the rotor magnets 53 into the faces of the stator assemblies 55 and 56, trav ⒺRrse a quarter turn in either direction in this quadrupole example, and exit the stator assembly faces to link with either of the adjacent magnet poles on the rotor assembly 51.

The stator ferromagnetic assemblies 55 and 56, which are toroidal, may be fabricated of molded bonded powdered metal or laminated, as by winding ferromagnetic strip of width equal to the torus axial dimension about a mandrel sized to the torus internal diameter until sufficient material is built up to achieve the desired torus external diameter. A powdered metal stator ferromagnetic assembly has limited permeability, in the 50 to 500 range, but is magnetically isotropic (equal characteristics in all directions), and relatively easy to form. The low permeability limits the permeance which may be achieved in the stator assembly as a whole. Sheet-steel laminations offer much higher permeabilities, in the 5,000 to 100,000 range, but the commonest thin materials, such as grain-oriented silicon steels, are not isotropic, having a low transverse (across the grain) permeability which increases the reluctance of the axial portion of the flux path within the stator. Amorphous ferromagnetic materials are nearly isotropic and of very high permeability, above 100,000, offering low path reluctance.

Slots 57 and teeth 58 may be readily formed in the powdered metal stator ferromagnetic assembly as part of a molding process. Slots 57 and teeth 58 may be formed in a wound laminated torus by edge notching prior to winding or machining or grinding after winding and bonding the laminations together.

Powdered metal fabrication is simple if low permeability is acceptable. Edge notching the laminations of silicon steel is possible, but notch spacing must be increased as the torus diameter increases to preserve slot geometry, implying computer control of the notching process and probably post-winding machining or grinding to true the slots 57. Whole-slot machining post winding and bonding without prior notching is possible, but is time consuming and expensive as considerable material must be removed. The thin sections and extraordinary hardness of amorphous ferromagnetic materials have thus far rendered processes like pre-winding notching or post-winding slot machining economically impractical. Heat-induced grain formation at machined or ground surfaces is a further deterrent to mechanical processing.

OBJECTS OF THE INVENTION

The primary object of this invention is to contribute to the reduction of the U.S. energy budget by increasing efficiency of motors, ballasts, transformers, and inductors.

Another object of this invention is to establish the utility of amorphous ferromagnetic material in rotating machines and small wound products using slitting, shearing, and folding or bending in lieu of punching to form useful lamination shapes.

Another object is to apply the same techniques to less exotic materials such as silicon steels.

Another object of the invention is to fabricate composite stator structures utilizing ferromagnetic materials with differing properties.

Another object of the invention is to fabricate form composite stator magnetic circuit structures of both metal and structural plastic.

Additional objects and features of the invention will appear from the following description in which the preferred embodiments are set forth in conjunction with the accompanying drawings

THE DRAWINGS

DESCRIPTION OF THE PREFERRED EMBODIMENTS

Figure 2:
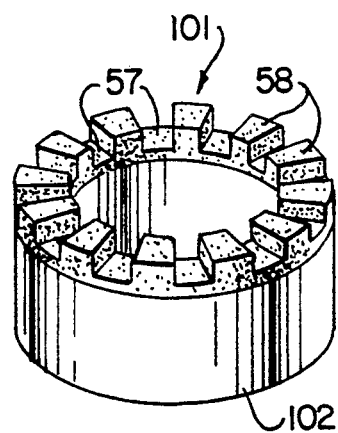
FIG. 2 is an isometric view of a composite stator for an axial-gap motor.

A two-component composite ferromagnetic stator structure using energy-efficietn materials for a permanent-magnet-rotor-axial-gas motor is shown in FIG. 2. Here a stator tooth assembly 101 of shallow axial extent, including all stator slots 57 and teeth 58, is formed by molding powdered ferromagnetic metal, bonded with adhesives to provide a torous 102 having no stator slots or teeth. Fabrication of both structural components is straightfoward. Both components are magnetically isotropic, so the magnetic flux readily develops radial and circumferential path components as needed. In a typical design roughly ten per cent of the flux path is in the low-permeability powdered material, which therefore dominates the stator principal magnetic flux path reluctance. The rotor magnets 53 are likely to have a combination of thickness and permeability (usually close to 1) which dominates the total motor magnetic flux path reluctance which includes reluctance of the rotor and rotor-stator airgaps. Non- or partially-grain-oriented silicon steel or similar ferromagnetic materials are alternatives to the amorphous ferromagnetic material if available in appropriate lamination thickness, transverse and longitudinal permeabilities.

Figure 3:
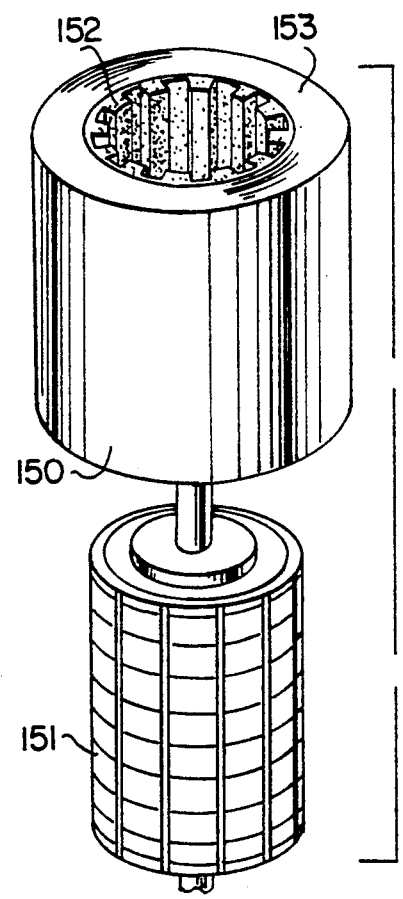
FIG. 3 is an exploded isometric view of selected components of a radial-gap motor with composite stator.

The counterpart of FIG. 2 is shown in FIG. 3 in a radial-gap motor having a stator assembly 150 and a rotor assembly 151 (a squirrel-cage configuration is suggested). A ferromagnetic powder stator tooth assembly 152 may be molded in a single piece, or in axial or radial sectors (see FIG. 6, below). The amorphous ferromagnetic material toroid 153 may be wound from strip stock and bonded to the stator tooth assembly 152 with adhesives. The shortcoming of this design is that the stacking factor of amorphous ferromagnetic material lamination sheet is in the range of 80%. That which is not amorphous ferromagnetic material is oxide, applied insulation, or air, none of which is ferromagnetic. Therefore radial flux components encounter a structure which is 20% non-ferromagnetic with a resultant permeability of about 5. The principal magnetic flux path reluctance in the stator is high relative to the configuration of FIG. 2, and requires correspondingly higher driving currents or thicker rotor magnets.

Figure 4A:
FIG. 4A is an isometric view of a portion of a circular stator lamination segment fanfolded from a straight strip of ferromagnetic material.
Figure 4B:
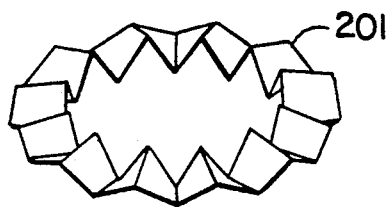
FIG. 4B is another isometric view of a circular stator lamination segment fanfolded from a straight strip of ferromagnetic material in which the fanfolding is at a lesser angle than that shown in FIG. 4A.
Figure 5:
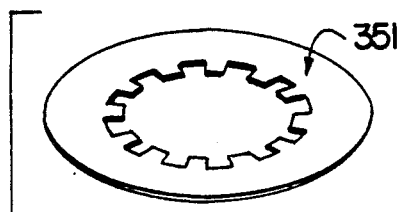
FIG. 5 is an isometric view of a stator magnetic circuit ring structure formed from an extended fanfolded straight strip of ferromagnetic material by winding as an helix.
Figure 5:
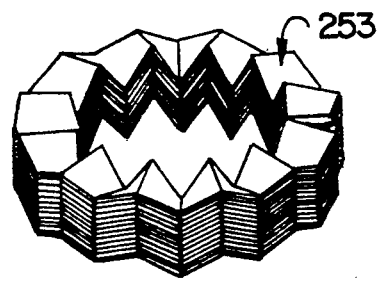
Figure 5:
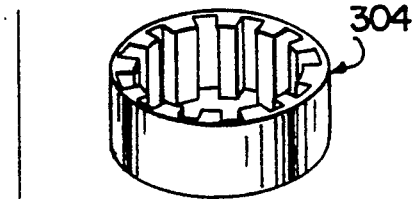
Figure 5:
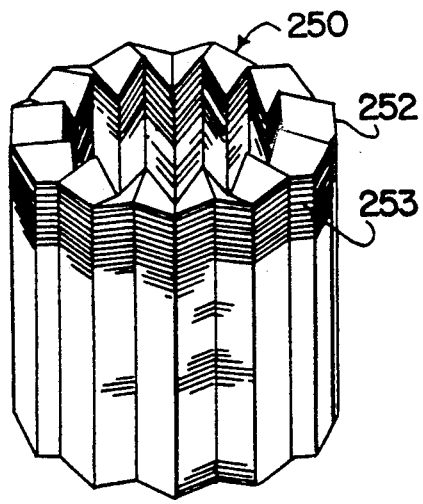

A child's fan may be formed by folding roughly equal pleats in a sheet of paper to form a narrow stack. If the folded stack is held with the stack compressed at one edge, the free edge approximates an arc of a circle. Application of this technique to stator structure is illustrated in FIGS. 4A and 4B. In FIG. 4A a strip of metal 200 has been folded across the longitudinal axis of the strip, alternating the direction of the folds. It is like the child's fan or computer paper, fanfolded. It is easily deflected in any direction along the mean axis of the strip. In FIG. 4B the fanfolded strip of FIG. 4A has been extended, deflected, and closed end-to-end (the joint is not shown) to form a rough circle 201 (the actual form is a polygon). The closed figure of extended fanfolded strip shown in FIG. 4B generally defines a plane, with the folds disposed alternately on opposite sides of the plane and the faces of the fanfold, each face bounded by two folds and the two edges of the strip, passing through the plane. The fold lines of a closed figure so fabricated lie in planes (not shown) radial to the central axis of the closed figure. The fold angles in the extended fanfolded strip are less than 180 degrees so that faces adjacent to a given fold diverge from each other. In this construction each face is somewhat twisted between the inner and outer margins of the closed figure, and the fold angle is greater at the inner margin of the closed figure that at the outer margin, the difference of fold angles being a measure of twist in each face. It is immediately apparent that a long fanfol.ded strip may be as a helix with the faces of adjacent turns in close proximity to each other and ultimately will form a near-cylindrical structure like that of FIG. 5, with the folds of adjacent turns of the fanfolded strip in registration and corresponding faces of adjacent thurns in close proximity to each other as shown in FIG. 5, a fanfolded stator magnetic circuit ring 250. Though the magnetic flux path through said fanfolded stator magnetic circuit ring 250 is extended and reluctance is thus raised by the folding, the high working permeability of the ferromagnetic material, particularly if amorphous, renders the effect of increased ferromagnetic path length small relative to reluctance of a typical rotor-stator airgap. The fanfolded stator magnetic circuit ring 250 may be divided into axial segments 253 for purposes described hereinbelow. It should be noted that the fanfolding need not be acute for purposes of this invention. Simple or multi-radius bends, parabolic, exponential or other bend forms may be used if appropriate. It is also potentially advantageous to vary the fold pitch cyclically, as for example to reduce the airgap between the fanfolded stator magnetic circuit ring and a polygonal external surface of a stator tooth assembly. All such fold patterns will be referred to hereinafter as fanflding. Fanfolded stator magnetic circuit rings 250 may be formed of a plurality of interleaved strips wound simultaneously.

The structure of FIG. 5 has desirable attributes as a fanfolded stator magnetic circuit ring 250:

1) The magnetic flux enters and leaves from inner edges 251 as in FIG. 2 and need not cross from layer to layer of the laminations.
2) It may be formed by slitting, folding, and shearing only. Punches and machining operations are not needed.
3) It may be formed by a winding process.
4) Multiple interleaved strips may be wound simultaneously.
5) Its approximation to a cylinder, may be made as fine as desired by increasing the fanfold pitch, decreasing the interfold distance.
6) No material is wasted.
7) The structure is radially elastic, so it may be easily approximated to the stator tooth assembly during assembly of the whole stator assembly with airgap small relative to the rotor-stator airgap.

Figure 6:
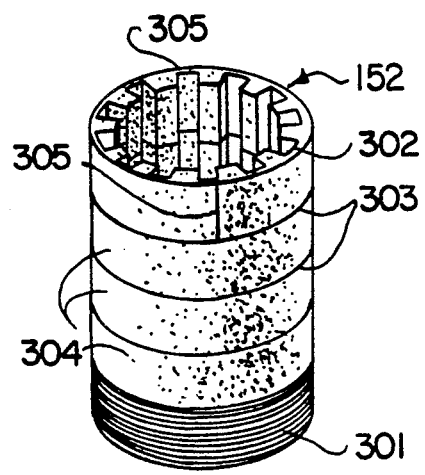
FIG. 6 shows an isometric view of stator tooth assembly sections formed from powdered material and from typical punchings from lamination sheet stock.

As shown in FIG. 6 the stator tooth assembly 152 may be made of pressed ferromagnetic powder or by punching from conventional sheet lamination materials 301, preserving a narrow intertooth link 302 at the perimeter to maintain intertooth geometry. It may be divided axially 303 into segments 304. Segments may be divided radially 305 for convenience in pressing or punching.

The fanfolded stator magnetic circuit ring assembly 250 of FIG. 5 will not transmit stator torque reaction effectively because of its thin sections and fanfolds. However, the torque reaction of a motor is small—seldom above 10 pounds per square inch of rotor-stator airgap area. It is trivial relative to the shear strength of a conventional stator lamination stack. Viewed another way, torque reaction could be delivered to the motor frame through a small fraction of the usual laminations.

Figure 7:
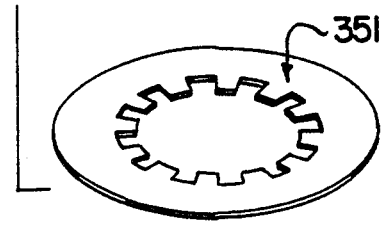
FIG. 7 shows an exploded isometric view of an axial segment of a composite stator assembly including stator support rings, fanfolded stator magnetic circuit ring, and stator tooth assembly.

Accordingly, the fanfolded stator magnetic circuit ring assembly 250 of FIG. 5 and the stator tooth assembly of FIG. 6 may be divided axially into a plurality respective segments 253 and 304 and assembled interspersed with full-diameter stator punchings 351 as shown in FIG. 7. The fanfolded stator magnetic circuit ring axial segments 253 may then rest around the stator tooth assembly segments 304 between the stator support rings 351 which, when bonded to the stator tooth assembly segments 304, deliver the torque reaction from the stator teeth to the motor frame (not shown) without torque loading the fanfolded stator magnetic circuit ring assembly segments 253.

Where the axial faces of the fanfolded stator magnetic circuit ring segments 253 abut the plane stator support rings 351 small triangular airgaps (or other shapes, depending on fold geometry) increase the reluctance of the path from the outside of the stator tooth assembly segments 304 to the fanfolded stator magnetic circuit ring assembly 253. In an aggregate these triangles have an area equal to the axial projection of a single turn of the fanfold multiplies by stator tooth assembly segment 304 outer perimeter, adding to magnetic circuit reluctance. This reluctance increment occurs between each adjacent pair of stator support rings 351. It may be reduced by increasing the pitch of the fanfolds, and by designing the folding so that the outer perimeter of the fanfold 252 is essentially flat.

Figure 8:
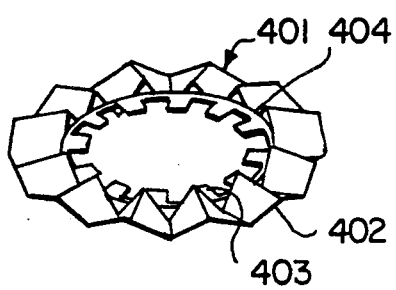
FIG. 8 is an isometric view of a stator support ring which has been formed so that it mates axially with fanfolded stator magnetic circuit rings and stator tooth assemblies.

The reluctance of the triangular airgaps at th stator tooth assembly segment 304 to fanfold stator magnetic circuit ring 253 junction may be nearly eliminated by forming the stator support rings 351 with indentations which match the shape of the fanfolded stator magnetic circuit segment ring 253, to produce a fanfolded stator support ring 401, as shown in FIG. 8. The inner margin fanfolded portion 402 of the stator support ring 401 passes the plane of the stator tooth portion 403 of the stator support ring 401, equivalent to a single lamination of the stator tooth assembly 301, between each fold of the fanfolded portion 402 of the fanfolded stator support ring 401 where they join and where torque reaction forces are transmitted. These local forces may be reduced by increasing fanfold pitch. Multiple fanfolded stator support rings 401 may be used adjacent to each other.

The use of ferromagnetic stator support rings 401 adds to the iron losses of the stator assembly. The local stress levels in the fanfolded stator support rings 401 can be high, as described above, and exacerbated by the stresses of forming Magnetic attraction between rotor and stator produces a larger stress than does torque reaction. The magnetic stress is most concentrated as tension in stator teeth and compression in the intertooth links 302 of the stator tooth assembly 152. These intertooth links 302 must have sufficient section in aggregate to resist this force. Where thin punched stator tooth laminations are used they may be bonded to each other into a composite structure to resist buckling The fanfolded stator magnetic circuit rings 253 are continuous electrically, and will develop axial potentials which must be interrupted by insulation. Inexpensive fiberglass-filled thermosetting resins have strengths in the same range as do lamination steels. A structural plastic stator support ring 401 may provide both support and insulating functions, and may have more favorable stress tolerance than a formed steel stator support ring 405 because of its molded nature. Stiffening ribs, ventilation holes, and mounting bosses may be included in the stator support ring 401 design (not shown). The outer rim may be molded into, a flange to stiffen the stator support ring 401, to retain the fanfolded stator magnetic circuit rings 253 and isolate them from the motor frame, and to facilitate bonding to the motor frame.

Figure 9A:
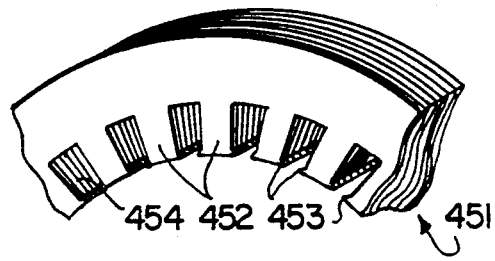
FIG. 9A is an isometric view of a cutaway section of a typical punched stator lamination representation of the prior art.

A segment 451 of a stator lamination punched stack typical of the prior art is as shown in FIG. 9A. Note that the stator teeth 452 are rectangular with small lips 453 at their inner (closest to the motor axis) corners, used with wedges (not shown) to retain windings (not shown) in the winding slots 454. The winding slots 454 are of keystone shape and in practice are commonly lined with insulating slot liners of a fiber insulation material (not shown) to forestall shorting of windings to stator laminations.

Figure 9B:
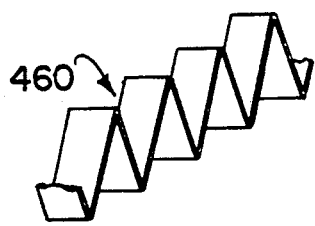
FIG. 9B is an isometric view showing a fanfolded ferromagnetic strip used for fabricating a stator tooth.
Figure 9C:
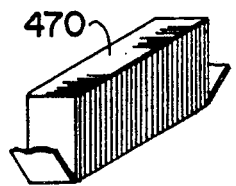
FIG. 9C is an isometric view showing the fanfolded ferromagnetic strip of FIG. 9B compressed to form a stator tooth molded structural plastic stator slot liners.

The synthesis of a stator tooth 460 from fanfolded ferromagnetic (in this case the folds must be sharp) strip is shown in FIGS. 9B and 9C. In FIG. 9B a fanfold 460 made of ferromagnetic strip with width equal to stator tooth width and interfold length equal to tooth length is shown. In FIG. 9C an extended segment of such fanfold has been compressed into a rectangular prism 470 by bringing the faces of the folds of the strip into close proximity to each other to produce a stator tooth. Such a compressed segment may conveniently have axial length equal to the distance between adjacent fanfolded stator support rings 401.

Figure 10A:
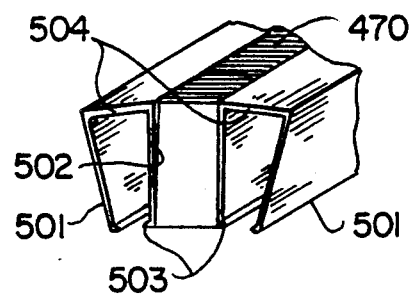
FIG. 10A is an isometric view showing molded structural plastic stator slot liners for supporting a fan-folded stator tooth.

FIG. 10A is an enlarged view of molded structural plactis slot liners 501. Fanfolded stator teeth 470 are placed in the gap between them 502. The slot liners may be molded of glass fiber filled or similar structural plastic material, investing them with considerable mechanical strength. Winding retention lips 03 may be molded into their free edges, supplanting the tooth lips 453 of conventional lamination punchings 451. Fanfolded tooth lamination segments 470 in the gaps between the slot liners 501 are bonded to the slot liners 501 to bear the rotor-stator attraction and torque reaction forces as shear loads on the deep side walls of the slot liners 501. The combination of slot liners 501 and fanfolded stator teeth 470 forms a stator tooth assembly much like 152 of FIG. 3, but lacks the metallic strength in the intertooth links 302. Thickness of the outer wall of the slot liner 504 may be increased to provide additional strength (not shown).

Figure 10B:
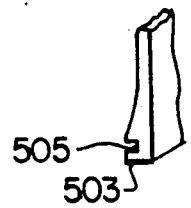
FIG. 10B is an isometric view of a portion of a stator slot liner shown in FIG. 10A.

FIG. 10B shows a section of a slot liner wall including a small slot 505 which may be molded into the lips 503 of the slot liner to supplant the stator lips 453 in positioning winding-retention wedges.

Figure 11:
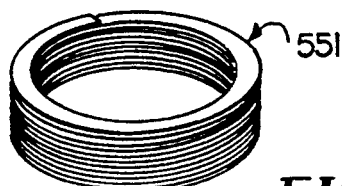
FIG. 11 is an isometric view of a helically wound stator compression ring.

FIG. 11 shows a stator magnetic compression ring 551 of helically wound flattened ferromagnetic wire, much like a child's Slinky ™, segments of which may be interposed between the fanfolded stator magnetic circuit ring 253 and the stator tooth assembly 152 to absorb compressive stresses arising in rotor-stator magnetic attraction. It is most useful to reduce compressive maggnetic attraction forces on the composite stator tooth assembly described with FIG. 10A, and described in a more complete context in FIG. 12, below. While this stator magnetic compression ring 551 is shown as circular, it may be polygonal to reduce airgaps with outer margins of fanfolded stator teeth 470, which are plane, and the inner margins of fanfolded stator magnetic circuit rings 253, which are polygonal and may be folded with pitch equal to the stator tooth pitch. With typical motor geometries these airgaps, even with a circular stator magnetic compressiong ring 551, will be small relative to teh rotor-stator magnetic airgap. Stator compression rings 551 may be formed of multiple interleaved flattened wires wound simultaneously.

Figure 12:
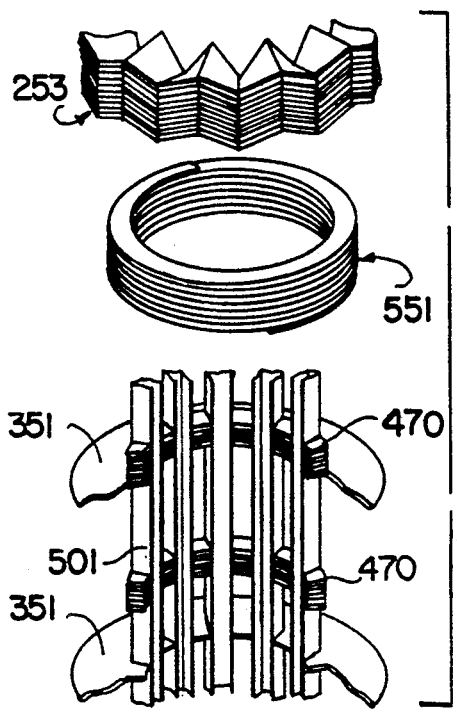
FIG. 12 is an exploded partial isometric view of an axial segment of a composite stator support structure with example placements of stator support rings, fanfolded stator magnetic circuit ring, stator compression ring, and stator tooth assembly.

FIG. 12 shows a..segment of a cage-like assembly comprised of a plurality of stator support rings 351 which are shown flat for simplicity but in practice are more likely to be fanfolded like the stator support ring 401 in FIG. 8, which stator support rings 351 support a plurality of slot liners 501 to which they after assembly of the complete stator structure less the conductive windings. This cagelike structure can be mechanically sufficient to support fanfolded stator teeth 470 and fanfolded stator magnetic circuit ring segments 253 to form a complete stator magnetic structure. Fanfolded stator teeth 47o are bonded between the slot liners 501 and deliver the torque reaction into the slot liners 501 in good part as a shear load. Circumferential flexing of slot liners 501 between stator support rings 351 may be minimized by limiting axial spacing between adjacent stator support rings 351, and strengthening slot liner lips 503 and outer walls 504. Circumferential compression arising in rotor-stator attraction may also be borne by stator magnetic compression rings 551 disposed abutting the outer surfaces of the fanfolded stator teeth 470 and the slot liners 501 as described above and shown in FIG. 12.

If stator support rings 351 are of molded structural plastic all necessary electrical isolation within the stator magnetic structure is provided, with the possible exception of a requirement for thin insulating layers between stator tooth assembly segments 304 and fanfolded stator magnetic circuit segments 253, and stator magnetic compressiong rings 551, any of which may have different axial pitches and therefore produce circulating currents between points of contact.

Figure 13A:
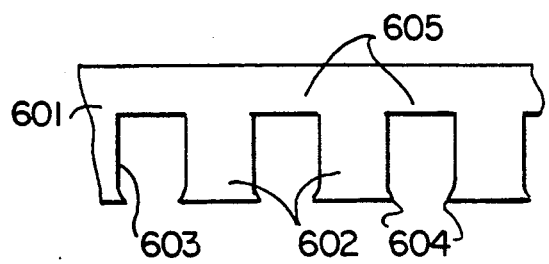
FIG. 13A is a plan view of a strip cut from a narrow strip of ferromagnetic material.
Figure 13B:
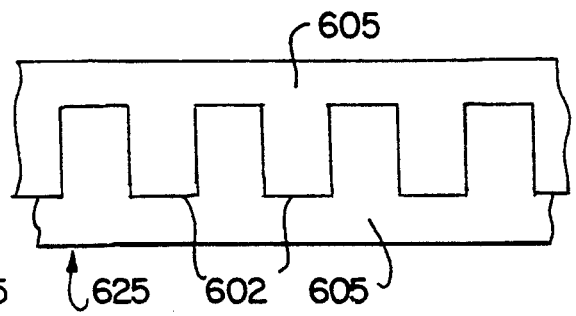
FIG. 13B is a plan view showing two stator tooth strips cut from a single strip of ferromagnetic material.

FIG. 13 illustrates the punching of stator tooth strips for fabrication of stator tooth assemblies 152 from straight strips of ferromagnetic material. In FIG. 13A a strip of ferromagnetic material 601 is passed through a punching process which creates stator teeth 602 by punching or notching out stator slots 603 from a single edge of the strip 601. Stator tooth lips 604 may be fashioned as part of the punching Individual stator teeth are joined by intertooth links 605. Stator slot punchings are waste material which may be recycled. In FIG. 13B a somewhat wider straight strip of ferromagnetic material 625 is punched to form two stator tooth strips without waste. The stator tooth lips may be created as part of the punching process (not shown), which will create local mechanical stress and magnetic flux concentrations, or supplanted by wedge retention slots molded into slot liners as shown in FIG. 10B.

Figure 14A:
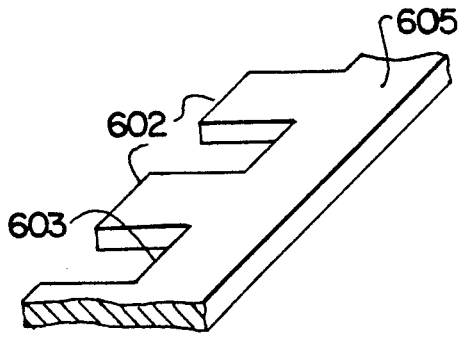
FIG. 14A is an isometric view of a portion of a stator tooth strip.
Figure 14B:
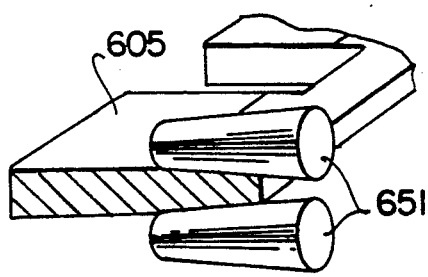
FIG. 14B is an isometric view of a stator tooth strip shown in FIG. 14A with one edge beign tatpered by a pair of rollers.
Figure 14C:
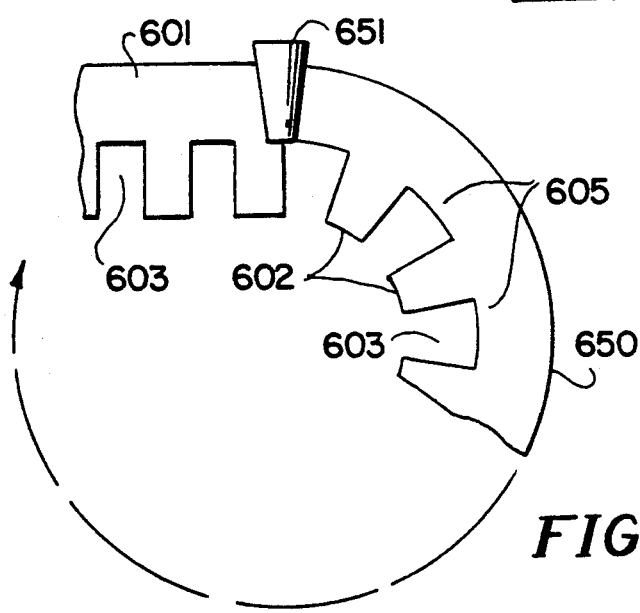
FIG. 14C is a plan view of the stator tooth strip shown in FIG. 14B in which the rollers therein are shown to provide a continuous taper on the outside edge to form an arc in the strip.

In FIG. 14 the formation of stator tooth assembly segments 304 is shown. FIG. 14A is an isometric cutaway view of a punched stator strip 650, illustrating the rectangular cross section of an intertooth link 605 after the stator teeth 602 are punched from the strip. FIG. 14B shows this intertooth link 605 passing between a pair of tapered rollers 651 which thin the continuousedge opposite the stator teeth 602 and stator slots 603, and thus increase the length of the rolled continuous edge. These rollers 651 may be configured so that they thin, only the stator intertooth links or may include stator tooth roots. In either case, as illustrated in FIG. 14C the effect is to transform the straight stator tooth strip stock 601,621 into a curved stator tooth strip 650 which may be formed in a helix multiple turns of which are accumulated into a stator tooth assembly segment 304. This stator tooth assembly segment 304 is assembled into an axial segment of a complete stator magnetic assembly as shown in FIG. 7. The edge thinning needed is of the order of 10% of the lamination thickness to turn the stator tooth strip 650 in the diameter of a typical stator tooth assembly 152. The edge thinning interferes little with function of the stator tooth assembly 152 as a stator compression ring 551. Reluctance of the stator tooth assembly 152 or the stator tooth assembly 30 is raised little by the edge thinning, particularly if thinning is limited to the intertooth links 605.

It may be seen that the preferred embodiments of stator structures disclosed in this invention may have a variety of forms assembled in various combinations from the components herein disclosed. Stator support rings 351, 401, may be ferromagnetic metal or structural plastic. The fanfolded stator magnetic circuit ring segments 253 may be amorphous ferromagnetic material or electrical steel, such as silicon steel. The stator tooth assemblies 152 or assembly segments 304 may be punched from lamination sheet stock 301, molded of ferromagnetic powder 304, fanfolded from ferromagnetic strip stock 470 and supported by structural plastic slot liners 501, or wound from notched ferromagnetic strip 601. Ferromagnetic stator magnetic compression rings 551 may be interposed as appropriate to resist rotor-stator magnetic attraction.

The stator structures evolved in FIGS. 2-14 can reduce stator iron losses by about 65% with fanfolded amorphouse ferromagnetic stator magnetic circuit rings 253 and punched steel stator tooth assemblies 301 and stator support rings 351 of common—12-14 mil—thickness steel. With molded plastic stator support rings 401 and fanfolded amorphous ferromagnetic stator teeth 470 the reduction of stator iron loss should approach 80%. Intermediate levels of iron loss reduction and simpler fabrication may be achieved with molded plastic stator support rings 401 and stator tooth assembly segments 304 formed as helical windings from stator strip stock 601, 625 per FIG. 14. This last form involves substantially no metal waste in stator fabrication, encouraging utilization of lower-loss, usually higher-cost ferromagnetic material.

Figure 1:
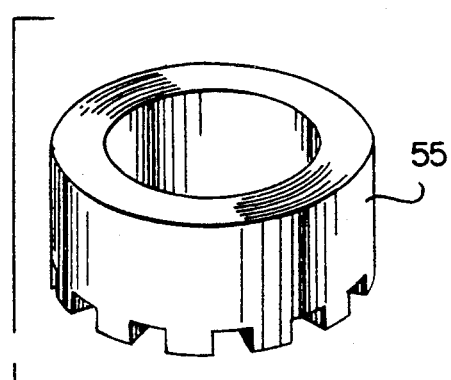
FIG. 1 is an exploded isometric view of selected components of an axial-gap permanent-magnet rotor electric motor representative of prior art.
Figure 1:
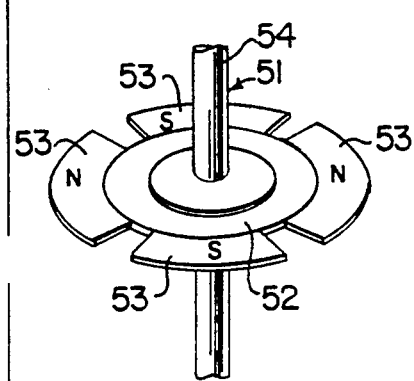
Figure 1:
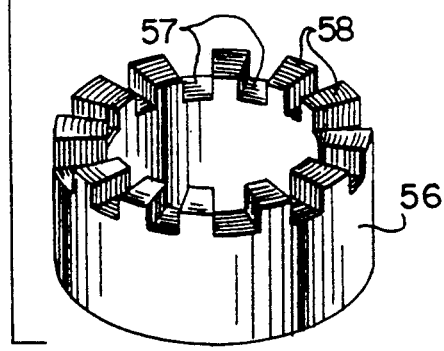
Figure 15A:
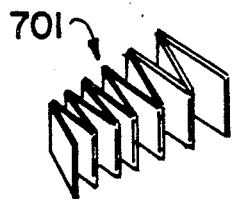
FIG. 15A is an isometric view of fanfolded strip stock in which the length of successive folds is progressively changed.
Figure 16A:
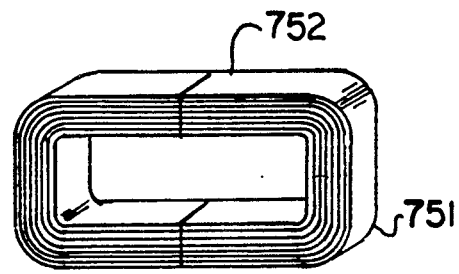
FIG. 16A is an isometric view of a prior art ferromagnetic core.
Figure 15B:
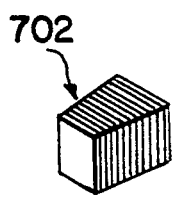
FIG. 15B is an isometric view of the fanfolded strip stock shown in FIG. 15A compressed to form a tapered stator tooth.
Figure 15C:
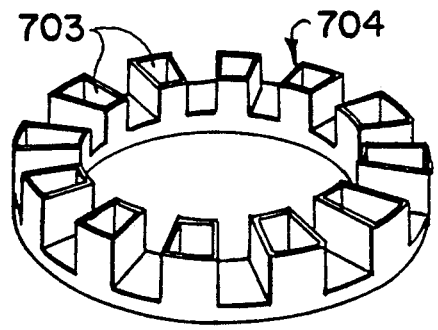
FIG. 15C is an isometric view of a molded structural retainer for receiving tapered stator teeth of the type shown in FIG. 15B for use in an axial gap motor.

The techniques enunciated above may be applied to stator tooth formation and mounting for axial-gap motors (see FIGS. 1 and 2) with reduced stator magnetic circuit path reluctance, as shown in FIG. 15. In FIG. 15A a strip of ferromagnetic material equal in width to the stator tooth length fanfolded with a progressively changing pitch 701. This fanfolded strip is compressed to the finished fanfolded stator tooth shape 702 as shown in FIG. 15B. Fanfolded stator teeth 702 so formed are then placed in a set of retainer cups 703 molded into a slot liner unit 704 formed of structural plastic as in FIG. 15C. This slot liner unit 704 including its complement of fanfolded stator teeth is bonded with adhesives to a wound ferromagnetic toroid 102 shown as in FIG. 2. The retaining cups 703 have open bottoms so that the stator teeth 702 may bond dir(R)ctly to the ferromagnetic toroid 102.

FIG. 16 illustrates application of folding techniques to fabrication of transformer cores. FIG. 16A illustrates the prior art, a common form of transformer core wound from ferromagnetic strip over a rectangular mandrel. The core 751 is wound, bonded and cut into two segments as indicated by a butt joint 752 to permit the windings (not shown) to be applied over one cr both legs of the wound core. With amorphous ferromagnetic materials cutting is extremely difficult due to the material's hardness, and crystallization is induced adjacent to the cut with consequent degradation of performance. Shearing of the amorphous ferromagnetic material is more desirable process as it is a quick cold process, but each lamina of the wound core 751 has a different length so that strip segments sheared in advance of assembly must be cut to different lengths. Such an assembly process is discouraging, though it has been approached successfully for distribution transformers, which are relatively large.

Figure 16B:
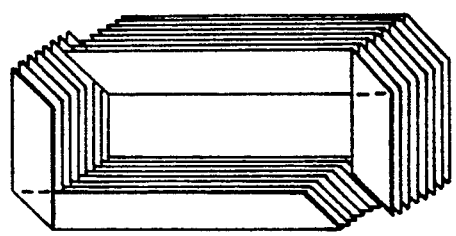
FIG. 16B is an isometric view of two segments of a core structure of the present invention having sections extending at right angles to each other.
Figure 16C:
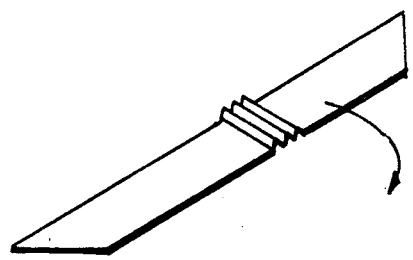
FIG. 16C is an isometric view of a ferromagentic strip having fanfolds in a portion of its length.
Figure 16D:
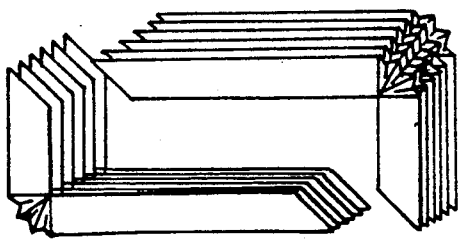
FIG. 16D is an isometric view of the segments of a core structure in which fanfolds are utilized to provide a right angle orientation in the legs of each segment.

Core fabrication is easier if lamination components are isomorphous. Common C E and I isomorphous laminations punched from electrical steel sheet stock are available in a wide range of sizes and are readily assembled. As noted in the Background of the Invention, amorphous ferromagnetic material is not successfully punched. However isomorphous laminations may be formed of amorphous ferromagnetic material by shearing and folding strip stock, as shown in FIGS. 16B, 16C, and 16D. In 16B a half core turn is formed by shearing strip stock into segments and folding along a 45 angle. The fold is compressed flat by bringing the faces of the folds into close proximity to each other. The angled shearing of the ends of the segments increases the area of the gap at the butt joint where two core half-turns meet, decreasing gap reluctance, but other shearing and folding angles and end-to-side butt joints may be used. The angle formed in the plane of the lamination by the flattened fold is rigid. Small errors of folding angle may increase the gaps at the joints.

A less rigid turn with potential for better gap alignment and lower gap reluctance may be by fanfolding a short section of a sheared strip segment, as shown in 16C, and creating turns as shown in 16D. Such isomorphous core laminations of amorphous ferromagnetic materials lend themselves to automated processing. Core stack thickness is increased in the region of the folds, but the folds may be located beyond the windings so they do not interfere. Alternatively the stack thickening may be reduced by extending the length of each turn, for example extending core turns of FIG. 16D to full semicircular turns with butt-joints at the center of the stacked core.

What is claimed is:

1. In a structure for forming a magnetic flux path in an electrical apparatus, a plurality of superposed elongate ferromagnetic strips having first and second edges and longitudinal axes, said strips having superposed fanfolds therein extending entirely across said strips from the first edge to the second edge at angles with respect to the longitudinal axes of said strips, said strips having therein fold angles less than 180 degrees, said strips being disposed closely adjacent to each other with a plurality of immediately adjacent folds in registration to form a substantially solid laminated structure to provide the flux path.

2. In a radial-gap electric motor having a longitudinal axis and having a stator structure, an elongate ferromagnetic strip having first and second edges and a longitudinal axis, said strip having fanfolds therein extending entirely across said strip from the first edge to the second edge at angles with erspect to the longitudinal axes of said strip, said strip having therein fold angles less than 180 degrees, said strip having faces between said fanfolds, said strips being deflected about the longitudinal axis of the motor, said strip having greater fold angles at the inner margin of the geometric figure than at the outer margin to provide a twist in each face, said strip having superposed portions extending over more than one turn disposed closely adjacent to each other along the longitudinal axis of the motor with a plurality of immediately adjacent folds in registration to form a substantially solid laminated magnetic flux path in the stator.

3. A structure as in claim 2 wherein the elongate ferromagnetic strip is deflected in a plane normal to the longitudinal axis of the motor to form a closed figure whose projection in a plane normal to the longitudinal axis of the motor is a polygon.

4. A structure as in claim 2 wherein the elongate ferromagnetic strip is wound into a helix whose projection in a plane normal to the longitudinal axis of the motor approximates a polygon.

5. A structure as in claim 2 wherein said elongate ferromagnetic strip is in the form of a plurality of separate ferromagnetic strips.

6. A structure as in claim 2 wherein the elongate ferromagnetic strip is deflected in a plane normal to the longitudinal axis of the motor to form a closed figure whose projection in a plane normal to the longitudinal axis of the motor approximates a circle.

7. A structure as in claim 2 wherein the elongate ferromagnetic strip is continuous over more than one turn about the longitduinal axis of the motor and is wound into a helix whose projection in a plane normal to the longitudinal axis of the motor approximates a circle.

8. A structure as in claim 5 wherein said plurality of strips are wound into a helix whose projection in a plane normal to the longitduinal axis of the motor approximates a circle.

9. A structure as in claim 26 together with a motor frame, a plurality of stator tooth assemblies, a plurality of fanfolded magnetic circuit rings disposed around the stator tooth assemblies and a plurality of stator support rings bonded to said stator tooth assemblies and secured to said motor frame.

10. A structure as in claim 9 wherein said plurality of stator support rings are disposed normal to the longitudinal axis of the motor and are spaced apart along the longitudinal axis of the motor, said stator support rings being formed of thin sections of ferromagnetic material.

11. A structure as in claim 9 wherein said plurality of stator support rings are disposed normal to the longitudinal axis of the motor and are spaced apart along the motor longitudinal axis, said stator support rings formed of thin sections of structural plastic material.

12. A structure as in claim 9 together with a pluraltiy of magnetic compression rings of flattened helically wound ferromagnetic wires disposed radially between the fanfolded magnetic cicuit rings and the stator tooth assemblies and axially between adjacent stator support rings.

13. A structure as in claim 12 having magnetic compression rings whose projection in a plane normal to the longitudinal axis of the motor is a polygon.

14. A structure as in claim 12 having magnetic compression rings whose projection in a plane normal to the longitudinal axis of the motor is a circle.

15. A structure as in claim 9 wherein each of said plurality of stator tooth assemblies has two ends, a generally cylindrical external surface extending between the two ends and an internal surface extending between the two ends, said stator tooth assemblies being comprised of spaced apart stator teeth having a length projecting towards the longitudinal axis of the motor and intertooth links disposed between the stator teeth and forming said external and internal surfaces, said intertooth links having a radial thickness which is relatively small in comparison to the length of the stator teeth, said stator tooth assemblies being spaced apart along the motor longitudinal axis of the motor, said tooth assemblies being formed of molded ferromagnetic powder.

16. A structure as in claim 9 wherein each of said plurality of stator tooth assemblies has two ends, a generally cylindrical external surface extending between the two ends and an internal surface extending between the two ends, said stator tooth assemblies being comprised of spaced apart stator teeth having a length projecting towards the longitudinal axis of the motor and intertooth links disposed between the stator teeth and forming said external and internal surfaces, said intertooth links having a radial thickness which is relatively small in compariston to the length of the stator teeth, said stator tooth assemblies being spaced apart along the motor longitudinal axis of the motor, said tooth assemblies being formed of punched laminations.

17. A structure as in claim 9 wherein each of said plurality of stator tooth assemblies has two ends, a generally cylindrical external surface extending between the two ends and an internal surface extending between the two ends, said stator tooth assemblies being comprised of spaced apart stator teeth having a length projecting towards the longitudinal axis of the motor and intertooth links disposed between the stator teeth and forming said external and internal surfaces, said intertooth links having a radial thickness which is relatively small in compariston to the length of the stator teeth, said stator tooth assemblies being spaced apart along the motor longitudinal axis of the motor, said tooth assemblies being formed of elongate arcuate ferromagnetic strips having inner and outer side edges with the outer edges being thinner than the inner edges, said inner edges having spaced apart notches therein to define the stator teeth.

18. A structure as in claim 9 wherein each of said plurality of stator tooth assemblies is comprised of a pluraltiy of spaced-apart stator teeth and spaced-apart structural plastic support members interposed between the stator teeth; said stator teeth being formed of superposed fanfolded ferromagnetic strips having compressed together folds, said folds of the fanfolded ferromagnetic strip lying generally in planes normal to the longitudinal axis of the motor, said structural plastic support members being generally disposed parallel to the longitudinal axis of the motor and having longitudinally extending side surfaces, said stator teeth having side edges abutting said side surfaces of the support members and adhesive means bonding said side edges to said side surfaces.

19. In an axial-gap motor construction having a longitudinal axis, a stator structure comrpising a toroid flat-wound of ferromagnetic strip stock having first and second surfaces, with the first and second surfaces of the flat-wound strip being disposed generally parallel to the longitudinal axis of the motor, said toroid having an end, a ferromagnetic powder stator slot and tooth assembly molded separately, and adhesive means bonding said toroid end to said ferromagnetic powder stator slot and tooth assembly.

20. In a magnetic core structure for an alternating-current apparatus, a plurality of superposed ferromagnetic strips each having first and second surfaces and first and second edges and a longitudinal axis, said first and second surfaces lying nominally in a plane, each of said strips having a turn in the longitudinal axis thereof lying nominally in said plane, each turn having fanfolds therien extending entirely across the strip from the first edge to the second edge and each turn having radially inner and radially outer margins, said fanfolds in said turns having greater fold angles at the radially inner margin of the turn than at the radially outer margin, said fanfolds effecting said turn while maintaining said first and second surfaces of the unfolded portions of the strip nominally in said plane.

21. In a magnetic core structure for an alternating-current apparatus, a plurality of superposed ferromagnetic strips each having first and second surfaces and first and second edges and a longitudinal axis, said first and second surfaces lying nominally in a plane, each of said strips having a turn in the longitudinal axis thereof lying nominally in said plane, each strip being folded entirely across the strip from the first edge to the second edge at an angle to the longitudinal axis of each strip and having the folds compressed so that the surfaces of the strip adjacent to a fold are in close proximity to each other, said fold effecting said turn while maintaining said first and second surfaces nominally in said plane.

22. In a radial gap motor construction, a motor frame, a stator, said stator comprising a stator tooth assembly, a fanfolded stator magnetic circuit ring surrounding said stator tooth assembly, stator support rings bonded to the stator tooth assembly and secured in the motor frame for supporting said stator tooth assembly in said frame, said stator magnetic circuit rings being helically formed from multiple interleaved strips of fanfolded ferromagnetic strip stock and a rotor rotatably mounted in the stator for rotation about a longitudinal axis.

23. In a radial gap motor construction, a motor frame, a stator, said stator comprising a stator tooth assembly, stator support rings secured to the motor frame and bonded to the stator tooth assembly for supporting the stator tooth assembly in the motor frame, a fanfolded stator magnetic circuit ring surrounding said stator tooth assembly and a helically wound stator compression ring interposed between the stator magnetic circuit ring and the stator tooth assembly and a rotor rotatably mounted in the stator for rotation about a longitudinal axis.

* * * * *